Jan. 17, 1939. A. J. PENICK ET AL 2,144,228
CONTROL VALVE MECHANISM FOR WELL HEADS
Filed July 16, 1936
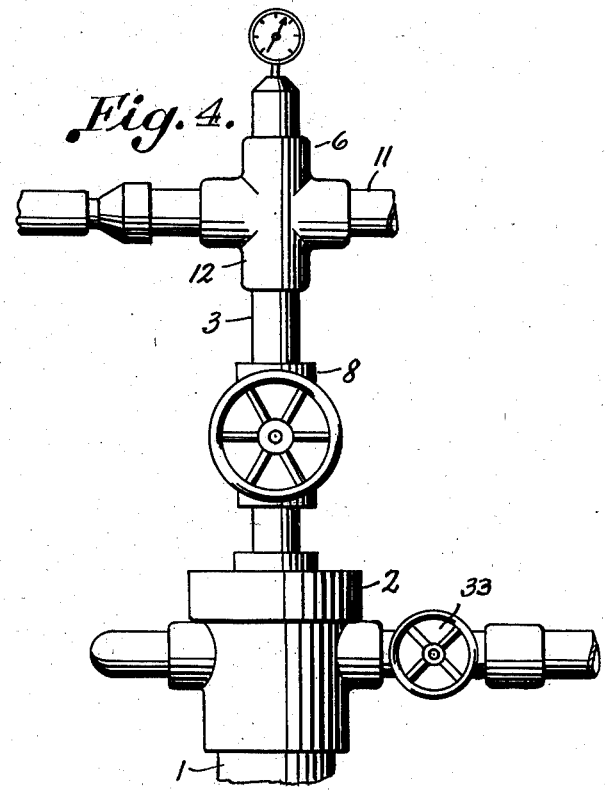
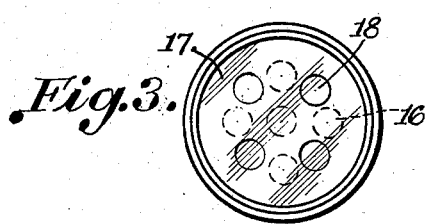
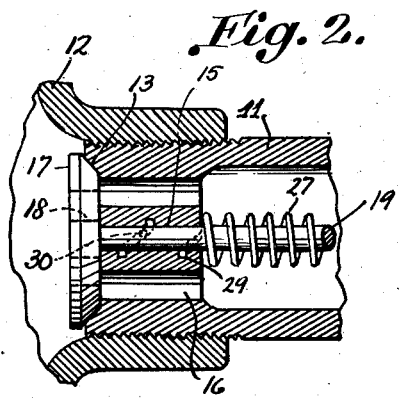
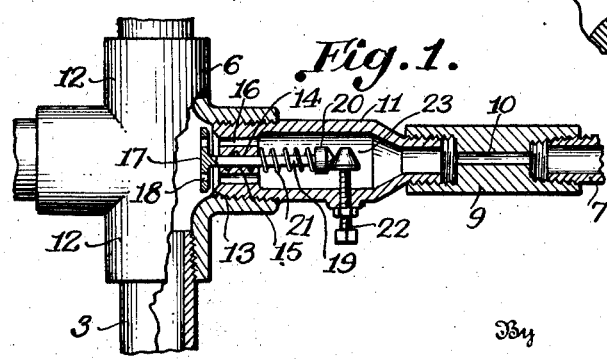
Inventors
Arthur J. Penick
Kirby T. Penick
By
Hardway Cather
Attorneys Patented Jan. 17, 1939

2,144,228

UNITED STATES PATENT OFFICE 2,144,228

CONTROL VALVE MECHANISM FOR WELL HEADS

Arthur J. Penick and Kirby T. Penick, Houston, Tex.

Application July 16, 1936, Serial No. 90,871

4 Claims. (Cl. 251—4)

This invention relates to control valve mechanism for well heads.

In the production of oil or other liquid, from wells, the liquid often flows under pressure, and is conducted from the well through a flow line leading off from the casing head or Christmas tree. This flow line is usually equipped with a choke to restrain or limit the flow of liquid from the well and the flow line is also usually equipped with one or more gate valves whereby the flow line may be manually closed or opened. In as much as the liquid flowing from the well is usually laden with sand and grit, the choke is gradually worn so that the passageway therethrough is enlarged to permit too much liquid to flow from the well, also the flow line valves or other fittings sometimes develop leaks which are cut out and enlarged by the gritty liquid flowing under pressure, thus permitting an increased flow of liquid from the well and necessitating the renewal and replacement of parts. It is an object of this invention to provide a valve mechanism which may be closed to prevent the outflow of liquid through the flow line in case of a substantial increase of the output of liquid from the well.

It is a further object of the invention to provide a valve mechanism of this character having a maximum capacity for the passage of liquid therethrough when the valve is in open position.

A further feature of the invention resides in the provision of a valve mechanism embodying a seat having liquid passageways therethrough and a valve having ports therethrough aligned with the passageways with means for moving the valve to position to carry the ports out of registration with the passageways when the valve is seated.

The invention also comprehends novel means for positively holding the valve open.

With the above and other objects in view, the invention has particular relation to certain novel features of construction, operation and arrangement of parts an example of which is given in this specification and illustrated in the accompanying drawing, wherein:

Figure 1 shows a sectional view of the valve mechanism as assembled with a Christmas tree and equipped with means for positively holding the valve open.

Figure 2 shows an enlarged fragmentary sectional view of the type of valve mechanism illustrated in Fig. 1.

Figure 3 shows an inside view of the valve, and

Figure 4 shows a side elevation of a well head showing the Christmas tree as well as the casing head provided with a flow line equipped with the improved type of control valve mechanism.

Referring now more particularly to the drawing, wherein like numerals of reference designate similar parts in each of the figures, the numeral 1 designates the well casing having the casing head 2 thereon through which the flow tubing 3 extends. The tubing is suspended from the casing head in any conventional manner with a fluid tight seal between them. A flow line leads out from the casing head and mounted on the upper end of the tubing 3 is any conventional type of Christmas tree 6 having one or more outflow lines as 7. Between the casing head and Christmas tree the tubing is usually equipped with a valve 8. The flow lines hereinabove referred to are usually equipped with chokes 9 having the restrained bores 10 therethrough to restrain the flow of liquid from the well, these chokes forming part of the respective flow lines into which they are connected. In the form shown in Figure 1, the inner end of the flow line 7 is formed of a bell shaped nipple 11 which is screwed into the cross connection 12 of the Christmas tree, said nipple forming a valve casing. The inner end of the nipple 11 is formed into an inwardly facing tapering valve seat 13 and adjacent said seat has the spider 14 which is formed with an axial bearing 15 and fluid passageways 16. The outer end of the valve casing 11 is reduced and threaded into the choke 9.

There is an inwardly open disc like valve 17 having the ports 18 which align with the passageways 16, when the valve is open. This valve is fixed to the inner end of the stem 19 which is slidable through the bearing 15. The outer end of the stem is formed with a head 20 whose outer end is of a conical shape as shown in Figure 1 and surrounding said stem and interposed between said spider and head there is a coil spring 21 normally intended to close the valve. A screw shaft 22 is threaded through the wall of the casing 11 and its inner end is provided with a cone 23 arranged to bear against the outer end of the head 20 to hold the valve 17 open. The outflow liquid will flow partly directly through said seat 13 and partly through the ports 18 and on through the passageways 16 and through the outflow line. When it is desired to permit the valve 17 to close, the screw shaft 22 may be outwardly screwed to release the cone 23 from the head 20 whereupon the valve 17 will seat.

In each form the bearing 15 has an inside helical groove 29 in which the stud 30 of the valve stem works. As the valve 17 moves to closed position the stud will cause said valve to partly rotate to carry the ports 18 out of registration with the passageways 16, when the valve is seated, so as to completely close the valve.

Should the passageway through the choke 9, become enlarged or should the flow connections become worn or develop a leak so that the parts are required to be renewed or replaced, the threaded shaft 22 may be screwed outwardly to release the head 20 and to permit the valve 17 to close and the outflow of the liquid will be stopped to permit the repairs or replacements to be made. When it is desired to again open the valve 17, the threaded shaft 22 may be screwed inwardly and the cone 23 will operate against the head 20 to open the valve 17 to permit the resumption of the flow of the liquid.

The drawing and description disclose what is now considered to be a preferred form of the invention by way of illustration only while the broad principle of the invention will be defined by the appended claims.

What we claim is:—

1. The combination with an outflow line having a tapering valve seat provided with a plurality of passageways for the outflow of liquid therethrough, a valve tapered to fit, and arranged to control, the seat and having ports therethrough, means for causing a partial rotation of the valve, as the valve moves toward seated position, whereby the ports are moved out of registration with the passageways when the valve is seated, and retractable means working through the wall of the outflow line, and normally holding the valve in open position.

2. A valve mechanism comprising a tubular casing having a seat and a passageway for the passage of liquid entering through the seat, a valve arranged to control the seat and having a port therethrough, means for causing a partial rotation of the valve, as the valve moves to closed position, whereby the port is moved out of registration with the passageway when the valve is closed, and manually controllable means working through the walls of the casing normally holding the valve in one of said positions.

3. A valve mechanism comprising a tubular casing having a seat, a valve arranged to control said seat, a stem on which the valve is mounted, means mounted on the casing and operative into one position into engagement with the stem to maintain the valve open and operative into released position to permit the valve to close, and means effective to rotate and close the valve upon release thereof.

4. A valve mechanism comprising a tubular casing having a seat therein and an adjacent spider provided with fluid passageways, a valve arranged to control said seat and having ports, a stem working through a central bearing in the spider and whose outer end is formed with a conical face, means mounted on the casing and having a conical face and operative into one position to cause the coaction of said faces to move the valve into open position and operative to another position to permit the valve to close, yieldable means for causing the valve to close and means to cause the valve to rotate as it moves to closed position to carry the ports out of registration with the passageways.

ARTHUR J. PENICK.
KIRBY T. PENICK.